(12) United States Patent
Shah et al.

(10) Patent No.: US 7,020,713 B1
(45) Date of Patent: Mar. 28, 2006

(54) SYSTEM AND METHOD FOR BALANCING TCP/IP/WORKLOAD OF MULTI-PROCESSOR SYSTEM BASED ON HASH BUCKETS

(75) Inventors: Vipul Shah, San Jose, CA (US); N.S.S. Narasimha Rao, Kakinada (IN); Alka Agrawal, Karnataka (IN); Subrata Sarkar, Bangalore (IN); Kumar Subramanian, Bangalore (IN); Himanshu Shukla, Bangalore (IN)

(73) Assignee: Novell, Inc., Provo, UT (US)

( * ) Notice: Subject to any disclaimer, the term of this patent is extended or adjusted under 35 U.S.C. 154(b) by 928 days.

(21) Appl. No.: 09/685,657

(22) Filed: Oct. 10, 2000

(51) Int. Cl.
*G06F 15/16* (2006.01)

(52) U.S. Cl. .................. 709/235; 370/395.32; 718/105

(58) Field of Classification Search ................ 709/245, 709/200, 235; 713/153; 718/105; 370/392; 707/103

See application file for complete search history.

(56) References Cited

U.S. PATENT DOCUMENTS

| | | | | |
|---|---|---|---|---|
| 6,111,877 A | * | 8/2000 | Wilford et al. | 370/392 |
| 6,363,396 B1 | * | 3/2002 | Klots et al. | 707/103 Y |
| 6,449,657 B1 | * | 9/2002 | Stanbach et al. | 709/245 |
| 6,587,866 B1 | * | 7/2003 | Modi et al. | 718/105 |
| 6,658,565 B1 | * | 12/2003 | Gupta et al. | 713/153 |

* cited by examiner

*Primary Examiner*—John Follansdee
*Assistant Examiner*—Dustin Nguyen
(74) *Attorney, Agent, or Firm*—Haynes and Boone, LLP

(57) ABSTRACT

A method and system is provided for balancing work load for a plurality of computer processors in a multiple processor computer system. In such a system, there are a plurality of packets to be processed. First, a plurality of hash buckets are generated and each packet is assigned to a bucket by performing a predetermined hash function. The different hash buckets are then assigned to the processors based on the workload of all the processors. In connection with processing connections with a timer thread, a plurality of connections are processed with a plurality of timer threads. A plurality of hash buckets are provided, and each connection is mapped to one of the hash buckets. Further, each hash bucket is assigned to a processor timer thread based on a workload thereof.

7 Claims, 2 Drawing Sheets

SYSTEM AND METHOD FOR BALANCING TCP/IP/WORKLOAD OF MULTI-PROCESSOR SYSTEM BASED ON HASH BUCKETS

BACKGROUND OF THE INVENTION

The present invention relates generally to computer software, and more particularly, to a system and method for utilizing hash buckets for managing workload in a multiple processor computer system.

In today's computer network environment, large volumes of data are customarily shared by multiple computers. In order to improve upon the efficiency of the computer network, multiple computer processors share the workload as well. Especially in a multiple processor computer system where a network protocol such as TCP/IP is used to link all participating processors, it is desirable to have the TCP/IP workload evenly distributed across these processors.

The current art finds some solutions by dealing with the workload distribution problem from three different levels. That is, the solutions are found in methods such as packet level workload distribution, layer level workload distribution, and connection level workload distribution.

According to the packet level distribution method, the loads of the processors at a packet level are monitored and IP packets are distributed across processors accordingly. This method seems to be fine-grained because the granularity of distribution is a single packet. However, this method has been proven to be an audacious proposal and does not work well for connection oriented protocols like TCP (although this technique has been proved to be effective while working with layers like UDP). Anomalies of packet level workload distribution such as out-of-order packet handling can play havoc with network performance and render the packet level workload distribution unreliable.

The layer level distribution method distributes the workload of various layers like IP, TCP, UDP onto various processors. This introduces additional queuing delays and context switches per packet level. Thus, it is also found to be limited in exploiting available parallel processing mechanism. Moreover, this mechanism can not scale to large numbers of processors since there are only a small number of layers.

For the connection level distribution method distributing TCP workload, statically mapping connections to processors can lead to load imbalance, and other negative performance impacts for a specific processor-bound application. The traditional dynamic mapping mechanism is not scalable, since the number of connections can be in the tens of thousands and re-balancing such large numbers of connections cannot be done in a performance-sensitive path like the network protocol path.

The main issue is to ensure that the workload distribution is equitable so that no processor is overloaded or underloaded thereby causing performance bottlenecks or resource waste. On the other side, because the network protocol path is performance sensitive, it is important that the workload balancing mechanism itself is not process intensive or resource intensive which adds itself as a "heavy weight" load to the processors.

Another technical bottleneck in a multiple processor system is a single timer thread structure, in which only one timer thread is designated for all processors. In order to optimize the advantage of having multiple processors in the system, multiple timer threads are desired to be used for parallel processing.

What is needed is an efficient method and system for equitably distributing process workload in a multiple processor network environment and an appropriate mechanism for using multiple timer threads.

SUMMARY OF THE INVENTION

A method and system is provided for balancing workload for a plurality of computer processors in a multiple processor computer system. In one embodiment, there are a plurality of packets from different connections needed to be processed. First, a plurality of hash buckets are predetermined by a hash function, and a connection is uniquely mapped to a hash bucket. A load balancer assigns the hash buckets through multiple queues to different processors so that the workload of the processors can be balanced. A queue model may also be applied to assure each processor gives a fair attention to packets from different connections in the hash bucket.

In another embodiment of the present invention, and in connection with processing connections with a timer thread, a method and system is further provided for processing a plurality of connections with a plurality of timer threads. A plurality of hash buckets are provided, and each connection is mapped to one of the hash buckets. Further, each hash bucket is assigned to a processor based on its workload so that the processor processes the connections relating to the assigned hash bucket, wherein the plurality of timer threads thus process the connections simultaneously.

DESCRIPTION OF THE PREFERRED EMBODIMENT

According to various examples of the present invention, the load balancing is performed using hash buckets. In essence, the connections are mapped to hash buckets using a hash function, and then the hash buckets are distributed across multiple processors based on the processor utilization variances.

Figure 1:
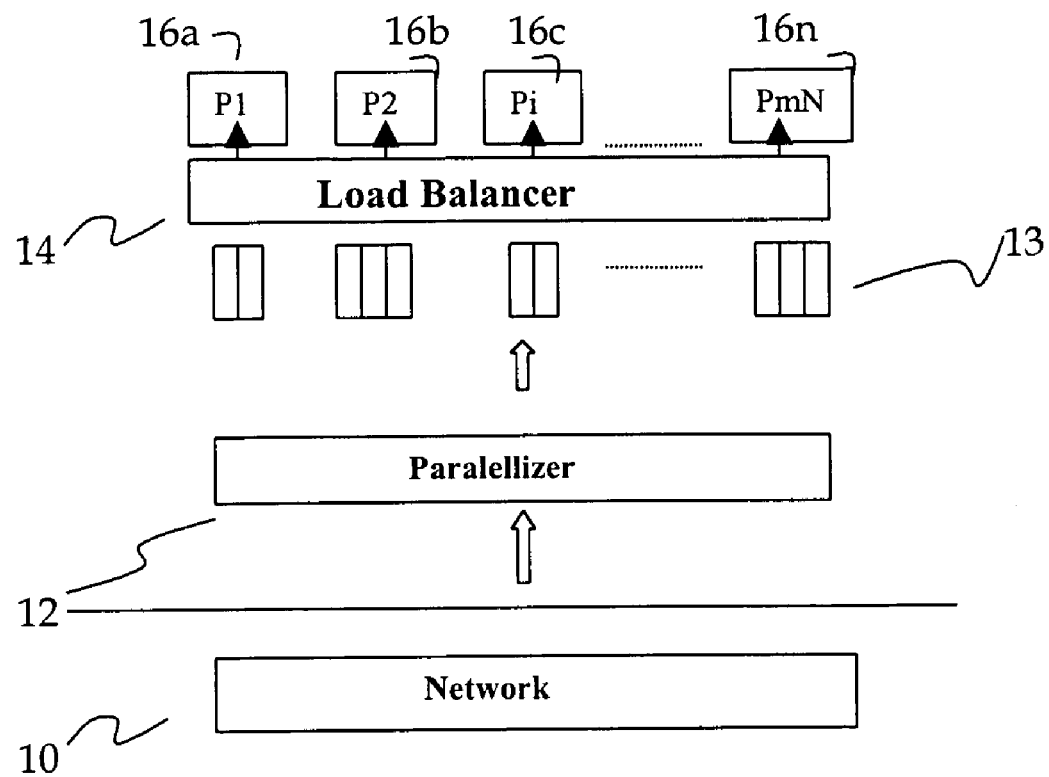
FIG. 1 illustrates a simplified graphical representation of a workload sharing mechanism for a multiple processor computer system according to one example of the present invention.

Referring now to FIG. 1, a network workload sharing mechanism of a multiple processor system is shown according to one example of the present invention. In this configuration, the network 10 is the main channel or the backbone for all information exchange. For illustration purposes only, it is assumed that the network uses the TCP/IP protocol, IP packets travel throughout the network. The packets are then fed into a paralellizer 12, which performs a hash function that maps each packet into a particular hash bucket 13. A hash function (or a hashing algorithm) is a process of transforming a message of any length into a fixed length output message. The output message is called a digest or bucket. A hash function can be designed so that it is computationally unfeasible to determine an input message from its corresponding output bucket. Although there are significant numbers of hashing algorithms known in the art, for the purpose of the present invention, only those fast or efficient hashing algorithms such as the "CRC based hashing algorithm" are desired. The primary goal for the hashing algorithm used in the examples of the present invention is to distribute a number of packets from different connections across the generated hash buckets. In essence, the hashing algorithm helps to map a non-finite number of connections to a finite number of hash buckets so that they can be controlled or manipulated better.

Not only do packets need to be directed to particular hash buckets, it must also be assured that packets from a predetermined connection go only to a dedicated hash bucket. By this arrangement, packets from a connection will be processed exclusively by a single processor, thereby avoiding unsynchronized processing of information from the same connection. It is well known that the four basic parameters (also known as "4-tuple") of the header section of the packet (i.e., <source address, source port, destination address, destination port>) are unique for each TCP/IP connection and are always identical with all the packets of a particular connection. In one example of the present invention, the hash bucket is identified by using the 4-tuple as a key to perform the hash function. Consequently, it is assured that packets from a particular connection will only be assigned to predetermined bucket.

Further, the same hash bucket can be reused by different connections. That is, packets from different connections can be mapped to the same hash bucket. Moreover, each processor can process multiple hash buckets. As a graphical representation, two or three hash buckets 13 adhere to each other in FIG. 1 to indicate that they are different hash buckets but are destined to the same processor.

Once the paralellizer generates the hash buckets, the packets in the hash buckets may be queued. Multiple queues are implemented to accommodate the configuration of multiple processors. Each queue has a predetermined number of hash buckets determined by a load balancer 14. The load balancer 14 positions itself between the queues of hash buckets and the processors (e.g., 16a–16n), and is responsible for monitoring the load of each processor and assigning different hash buckets to the processors. The load balancer has the ability to dynamically rearrange the hash buckets in the queues to the processors based on the level of capacity usage of each processor. Therefore, multiple processors can be used intelligently to maximize their collective efficiency.

In one example, the processor sequentially takes packets from different hash buckets assigned to it until all the hash buckets are reached in the round. However, it is possible that there are packets from various connections are assigned to a single hash bucket, and it is also likely that the numbers of packets from different connections may vary significantly. A queuing model may be applied to the hash bucket assigned to a predetermined processor to assure that packets from a single connection does not overcrowd (or as it is known, "hog") the processor while other packets from other connections are waiting to be processed by the same processor.

One example of the present invention is further explained below in the context of a four-processor system and a predetermined hash function with 4096 hash buckets. A hash function with 4096 hash buckets simply means that the hash function will generate a fixed-length bucket of 12 bits long. Hence, the values of buckets vary from 0 to 4095, which are used as identification numbers for the corresponding hash buckets. It is also understood that based on the hash function selected, the output can be any number, and doesn't have to be between 0 and 4095.

If it is found that statistically, a processor utilization distribution rate in terms of the percentage of capacity usage per processor is 10%, 15%, 11%, and 28% respectively for the four processors at a given instant, the total utilization rate for the entire four-processor system is considered to be 64% by summing all individual processor utilization distribution rates. An imbalance distribution index for each processor can be calculated by subtracting the processor utilization distribution rate from the total utilization rate. That is, the four imbalance distribution indexes for the processors are 54%, 49%, 53%, and 36%. A total imbalance index can be calculated by adding all the four imbalance distribution indexes together. In this case, the total imbalance index is (54+49+53+36)=192 (if the percentage sign is deem to be taken away). The hash buckets are then distributed based on the ratio between the imbalance distribution index of each processor and the total imbalance index. Therefore, the number of hash buckets distributed equitably in this example should be as follows:

Processor 1 (54/192*4096)=1152,
Processor 2 (49/192*4096)=1054,
Processor 3 (53/192*4096)=1130, and
Processor 4 (36/192*4096)=763.

Assuming that a good hash function is incorporated in the multiple processor system, and there are a large number of hash buckets, the load balancing method described above thus proactively distributes the workload. Also since it is based on load imbalance across the processors, the distribution is dynamically adjusted or adapted to the current load situation.

The general concept derived from above-described invention can be used in many areas of a multiprocessor computer system. For example, in a multiple processor system such as Novell's Netware Multiple-Processor system, the TCP/IP workload is distributed across the processors at the connection level. Although there are multiple timer threads like Delayed Ack Timer and KeepAlive Timer in some implementations, but most of the time, there is only one timer thread running to process a TCP connection table which lists all active TCP connections. The existing solutions in all implementation for TCP timers do not utilize the parallel execution of timer threads on different processors. In conventional methods, a single timer thread sequentially processes each connection one after another. The average delay between timer processing is likely to increase in proportion to the number of connections.

The present embodiment provides a unique way of splitting the process of handling the TCP Connection Table by the timer across multiple processors by mapping the connections in the TCP Connection Table to multiple hash buckets. According to one example of the present invention, at any instant of time a group of connections from the TCP Connection Table go through a hash function and are further mapped to each participating processor according to the result of the hash function. This mechanism allows the use of multiple timer threads simultaneously, and each timer thread running on a specific processor and processing disjoint sets of TCP connections at any instant of time.

Figure 2:
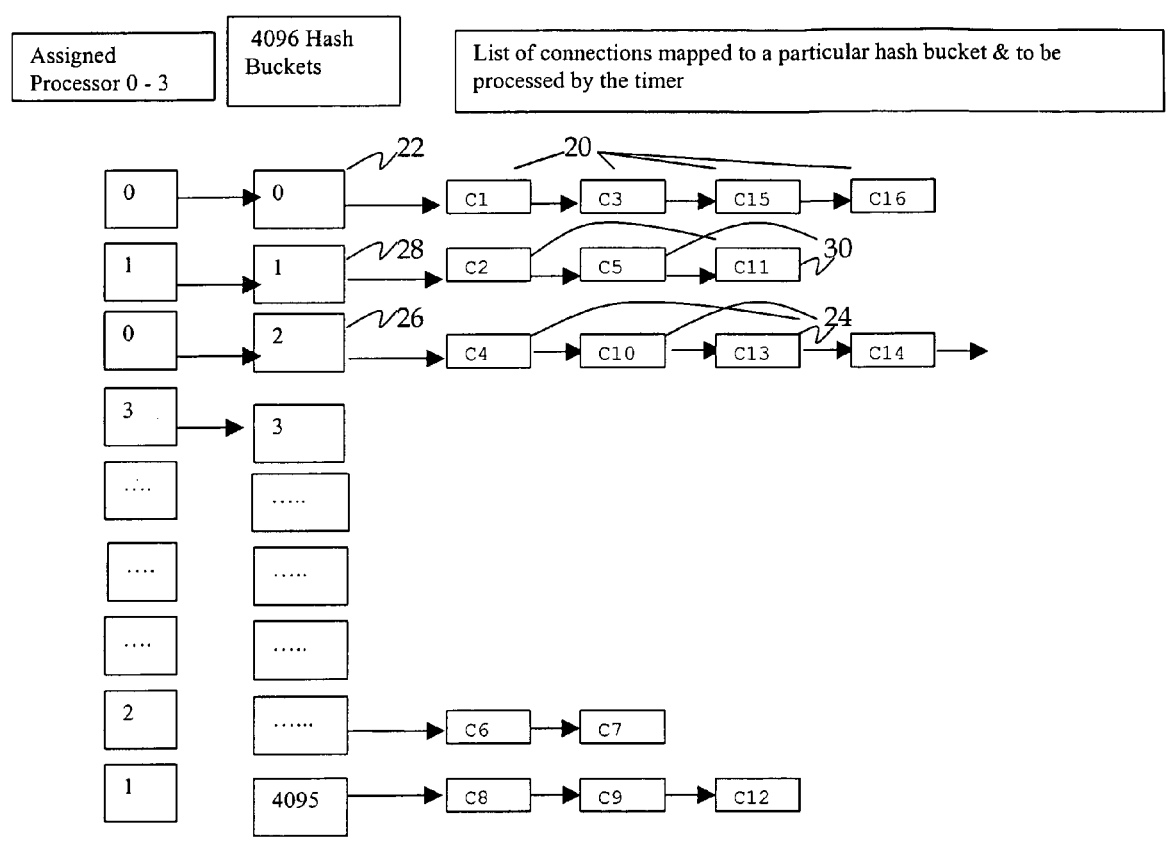
FIG. 2 illustrates a block diagram for implementing a multiple timer thread parallel processing system according to another example of the present invention.

Referring now to FIG. 2, a block diagram is shown for describing a use of multiple timer threads in a multiple processor system. Instead of using just a single timer thread, it is now possible to use multiple timer threads and each timer thread can process multiple hash buckets individually (e.g., N number timer threads with each processing on 4096/N buckets, where N is the number of processors). Since there is a single timer thread for each processor, and it processes a group of connections assigned to that particular processor, no connection can be processed by more than one timer thread. Hence, there is no need to have any locking mechanism for accessing connections in the Connection Table. As it is well known, a locking mechanism is needed only when more than one timer thread is accessing the Connection Table simultaneously. In terms of scalability, in case there are more than one processor and a large number of connections, employing multiple timer threads can be a true scalable solution. And in the immediate example, it can be said that the method employing N number timer threads is N times scalable than the conventional method.

As shown in FIG. 2, it is assumed that there are altogether 4096 hash buckets in a four-processor system and with timer threads scheduled at a fixed time interval. In this configuration, each TCP connection is mapped to one of these buckets based on four header parameters (i.e., local address, local port, remote address, and remote port) which are unique for each TCP/IP connection. Each hash bucket is further mapped to one of the participating processors (e.g., processor 0 to 3) based on the current workload of each processor. In this configuration, it is predetermined that four timer threads are spawned on the four processors every 224 milliseconds to process active TCP connections. For instance, the timer thread running on processor 0 first processes a set of connections 20 (which contains connections C1, C3, C15, and C16) mapped to the first hash bucket 22 (which is identified by its value "0"). Thereafter, the timer thread for processor 0 continues to process another set of connections 24 as identified by the hash bucket 2 (numeral 26). Apart from the timer thread for processor 0, other timer threads are working for other processors.

As shown in FIG. 2, the hash bucket 1 (numeral 28) is assigned to processor 1, and For example, it brings another set of connections 30 (i.e., C2, C5, and C11) for processor 1 to operate on. In the same fashion, the other two timer threads can independently and simultaneously work for processors 3 and 4 for processing connections. It can be comfortably assumed that, in a multiple processor system, a good hash function can be selected and a large number of buckets for mapping the connections are available as described earlier.

One advantage of the present invention is that it makes it possible to process the Connection Table by multiple timer threads in a parallel fashion and it also eliminates the need for a locking mechanism. The example of the present invention thus assures a faster processing of a collection of connections such as a Connection Table on a multiple processor system without resource contention between timer threads. Further, the present invention is scalable with regard to the number of processors and number of connections.

The above disclosure provides many different embodiments, or examples, for implementing different features of the invention. Specific examples of components, and processes are described to help clarify the invention. These are, of course, merely examples and are not intended to limit the invention from that described in the claims. For example, various acceptable hashing algorithms can also be used by one skilled in the art.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for balancing a workload for a plurality of processors in a multiple processor computer system, the system designed for processing a plurality of packets from a plurality of connections, the method comprising:

assigning a packet to a hash bucket determined by performing a predetermined hash function; and queuing the hash bucket to a processor so that the workload of all the processors are balanced, wherein the queuing includes identifying statistically a percentage of capacity usage for each processor;

obtaining an imbalance distribution index for each processor from the identified percentage of capacity usage; and distributing the hash buckets in proportion to the imbalance distribution index and in reverse proportion to a total imbalance index, wherein the total imbalance index is a summation of all obtained imbalance distribution indexes, wherein the hash function relates to a predetermined number of hash buckets, and wherein a plurality of packets from different connections can be assigned to the same hash bucket.

2. A computer program for balancing workload for a plurality of processors in a multiple processor computer system, the system designed for processing a plurality of packets from a plurality of connections, the computer program stored on a computer readable medium:

means for calculating a number of hash buckets to assign to a processor based on a ratio of an imbalance index of the processor and a total imbalance index, wherein the processor's imbalance index is based on a utilization rate of the processor and the system, and wherein the total imbalance index is based on the imbalance index of each processor;

means for assigning a packet to a hash bucket determined by performing a predetermined hash function; and means for queuing the hash bucket to a processor so that the workload of all the processors are balanced, wherein the hash function has a predetermined number of hash buckets, and wherein a plurality of packets from different connections can be assigned to the same hash bucket.

3. The computer program of claim 2 wherein the means for assigning includes means for using a source address, source port, destination address, and destination port parameters from the header section of the packet to identify the hash bucket.

4. The computer program of claim 2 wherein the hash function is designed to assign a plurality of packets from a connection to the same hash bucket.

5. The computer program of claim 2 further comprising means for monitoring the workload of each processor involved in the system.

6. A computer program for balancing workload for a plurality of processors in a multiple processor computer system, the system designed for processing a plurality of packets from a plurality of connections, the computer program stored on a computer readable medium:

means for assigning a packet to a hash bucket determined by performing a predetermined hash function; and means for queuing the hash bucket to a processor so that the workload of all the processors are balanced, wherein the means for queuing includes identifying statistically a percentage of capacity usage for each processor;

obtaining an imbalance distribution index for each processor from the identified percentage of capacity usage; and distributing the hash buckets in proportion to the imbalance distribution index and in reverse proportion to a total imbalance index, wherein the total imbalance index is a summation of all obtained imbalance distribution indexes, wherein the hash function has a predetermined number of hash buckets, and wherein a plurality of packets from different connections can be assigned to the same hash bucket.

7. The computer program of claim 2 wherein the means for queuing further includes means for applying a queuing model for packets in the hash bucket to assure that packets from a particular connection do not unduly occupy the processor for an undesirable time period.

* * * * *